United States Patent [19]

Kiyono et al.

[11] Patent Number: 4,691,116
[45] Date of Patent: Sep. 1, 1987

[54] SWITCH CONTROL DEVICE FOR MOTOR VEHICLE

[75] Inventors: Yasuhiro Kiyono, Nagaokakyo; Yutaka Takeyama, Toyonaka, both of Japan

[73] Assignee: Omron Tateisi Electronics Co., Kyoto, Japan

[21] Appl. No.: 762,471

[22] Filed: Aug. 5, 1985

[30] Foreign Application Priority Data

Aug. 7, 1984 [JP]  Japan ................... 59-165323

[51] Int. Cl.$^4$ ........................... H01H 3/14
[52] U.S. Cl. ................... 307/10 R; 307/9; 307/10 LS; 200/5 R; 200/5 A
[58] Field of Search ............ 307/10 R, 9, 10 SB, 307/10 BP, 10 LS, 112, 113, 115, 120, 141.8, 38, 39, 40; 200/5 R, 5 A, 5 D, 5 E, 1 R, 52 R, 52 A, 56 R, 61.27, 61.54, 159 B; 340/52 R, 52 F, 74, 79

[56] References Cited

U.S. PATENT DOCUMENTS

| 4,037,578 | 7/1977 | Dersch et al. ............... 307/9 X |
| 4,131,772 | 12/1978 | Weckenmann et al. ..... 200/61.27 X |
| 4,180,713 | 12/1979 | Gonzales ................. 200/61.27 X |
| 4,293,843 | 10/1981 | Bertoloni et al. ............ 340/52 F |
| 4,308,439 | 12/1981 | Itoh ........................ 200/5 B X |
| 4,317,106 | 2/1982 | Hüber ....................... 340/64 X |
| 4,340,945 | 7/1982 | Gothe ..................... 307/10 R X |
| 4,448,276 | 5/1984 | Nakamoto et al. ............. 180/90 |
| 4,501,012 | 2/1985 | Kishi et al. ................. 381/43 |
| 4,518,836 | 5/1985 | Wooldridge .............. 200/61.54 |
| 4,551,801 | 11/1985 | Sokol ..................... 340/52 F X |
| 4,575,673 | 3/1986 | Tedeschi et al. .......... 307/10 R X |
| 4,578,592 | 3/1986 | Nakazawa et al. .......... 307/10 R |

FOREIGN PATENT DOCUMENTS 2453443 10/1980 France .
8001477 7/1980 PCT Int'l Appl. ............. 340/64

OTHER PUBLICATIONS

European Search Report on European Application EP 85109893.
Patent Abstracts of Japan, vol. 6, No. 172, Sep. 7, 1982.

Primary Examiner—William M. Shoop, Jr.
Assistant Examiner—Shik Leun Paul Ip
Attorney, Agent, or Firm—Wegner & Bretschneider

[57] ABSTRACT

A switch control device for controlling a plurality of switches for actuating apparatuses of a motor vehicle, respectively, including at least one stop mode switch allowed to be operated only in a stop state of the motor vehicle and at least one running mode switch allowed to be operated in a running state of the motor vehicle and provided separately from the stop mode switch such that input operation of the stop mode switch and the running mode switch is regulated on the basis of whether the motor vehicle is in the stop state or in the running state.

13 Claims, 14 Drawing Figures

SWITCH CONTROL DEVICE FOR MOTOR VEHICLE

BACKGROUND OF THE INVENTION

The present invention generally relates to a motor vehicle or the like provided with various switches for automatically actuating a trunk opener, a sun roof, etc. and more particularly, to a switch control device for controlling the switches, which is arranged to regulate input operation of the switches on the basis of whether the motor vehicle is in a stop state or in a running state.

Conventionally, in switch control devices of this kind, a required number of various switches are provided on an instrument panel disposed at a front portion of a cabin of a motor vehicle so as to improve driving efficiency of the motor vehicle and upgrade functions of the motor vehicle.

However, in the known switch control devices, since the switches include stop mode switches permissible to be actuated only at the time of stop of the motor vehicle and running mode switches permissible to be at all times actuated and both the stop mode switches and the running mode switches are provided all together on the instrument panel, it is difficult to select a desired one from among the stop mode switches and the running mode switches, thereby resulting in deterioration of operating efficiency of the switches. Accordingly, the prior art switch control devices have such a drawback that a driver may erroneously operate, during running of the motor vehicle, one stop mode switch for actuating, for example, a trunk opener, thus resulting in a fatal accident. Furthermore, the prior art switch control devices have such an inconvenience that since under a poor driving condition, the driver cannot ensure that the switches have been operated, it is impossible to drive the motor vehicle safely.

SUMMARY OF THE INVENTION

Accordingly, an essential object of the present invention is to provide a switch control device for a motor vehicle, in which stop mode switches and running mode switches are provided separately from one another, with substantial elimination of the disadvantages inherent in conventional switch control devices of this kind.

Another important object of the present invention is to provide a switch control device of the above described type in which, on the basis of whether the motor vehicle is in a stop state or in a running state, either of the stop mode switches and the running mode switches are prevented from being operated improperly.

Still another object of the present invention is to provide a switch control device of the above described type which improves operating efficiency of the stop mode switches and the running mode switches and eliminates positively erroneous operation of the stop mode switches and the running mode switches so as to ensure driving safety of the motor vehicle.

In accomplishing these objects according to one preferred embodiment of the present invention, there is provided a switch control device for a motor vehicle provided with a plurality of switches for actuating apparatuses of said motor vehicle, respectively, the improvement comprising: at least one stop mode switch which is allowed to be operated only in a stop state of said motor vehicle; and at least one running mode switch which is allowed to be operated in a running state of said motor vehicle and is provided separately from said stop mode switch; said switches being constituted by said stop mode switch and said running mode switch such that input operation of said stop mode switch and said running mode switch is regulated on the basis of whether said motor vehicle is in said stop state or in said running state.

In accordance with the present invention, improper input operation of either of the stop mode switches and the running mode switches is regulated on the basis of whether the motor vehicle is in the stop state or in the running state. Thus, during running of the motor vehicle, input operation of the stop mode switches is not allowed to be performed, but input operation of only the running mode switches is allowed to be performed. Accordingly, since erroneous operation of the switches is completely eliminated, the input operation of the switches can be performed safely, reliably and easily.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
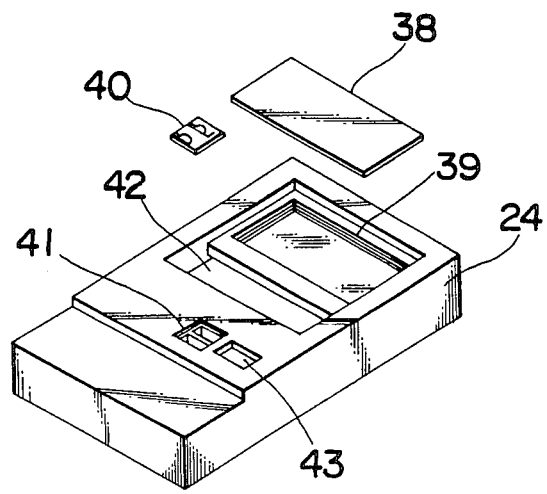
FIG. 1 is an exploded perspective view of a switch control device according to a first embodiment of the present invention.
Figure 1:
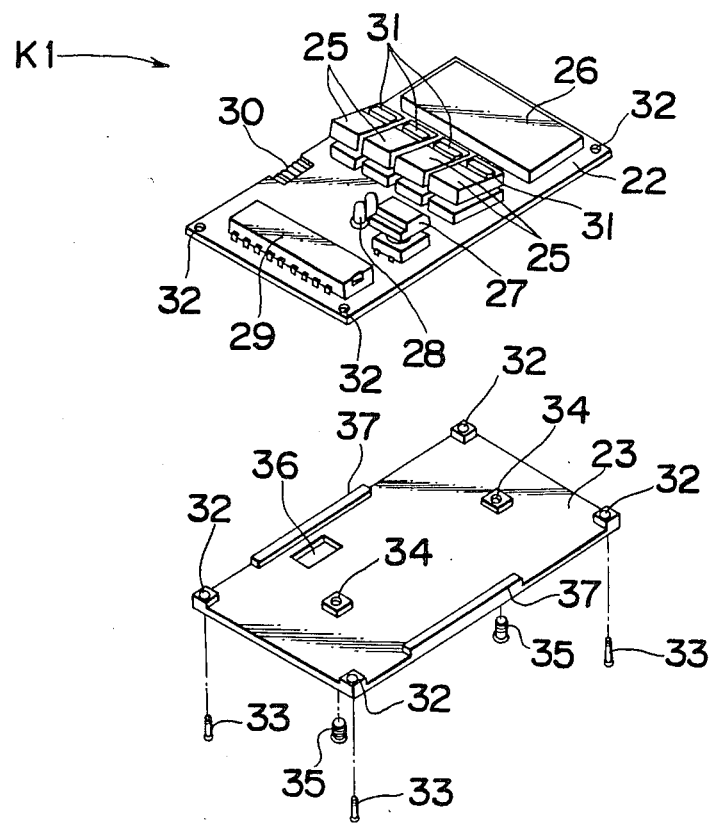
Figure 2:
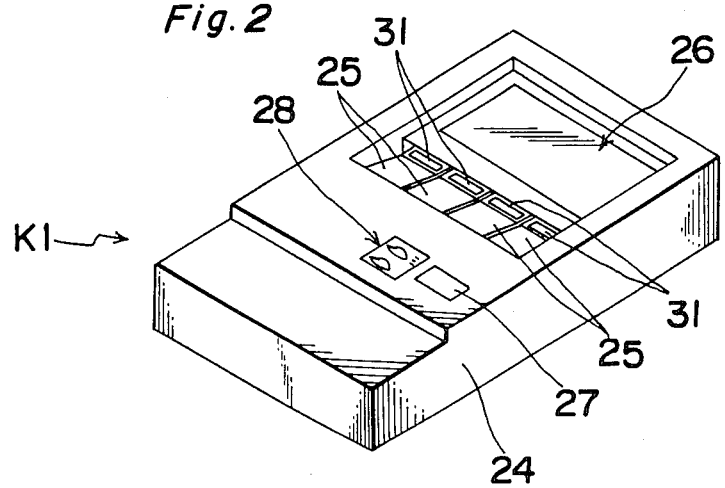
FIG. 2 is a perspective view of the switch control device of FIG. 1.

Referring now to the drawings, there is shown in FIGS. 1 and 2, a switch control device K1 for a motor vehicle, according to a first embodiment of the present invention. The switch control device K1 is constituted by a printed circuit board 22 having various control components mounted thereon, a casing 24 for accommodating the printed circuit board 22 and a base 23 for securing the printed circuit board 22 to the casing 24.

A plurality of push-button switches 25 corresponding to various apparatuses of the motor vehicle, a liquid crystal display (LCD) 26, a mode changeover switch 27 for effecting changeover between a running mode and a stop mode of the motor vehicle, two light emitting diodes (LEDs) 28 for displaying, through the energizing, marks indicative of the running mode and the stop mode, respectively, and a control circuit 29 for controlling input and output signals of these electrical components 25 to 28 are mounted on the front face of the printed circuit board 22. The switch control device K1 further includes input and output flexible cables 30.

In the case where the mode changeover switch 27 has been set to the stop mode, marks indicative of functions to be performed in a stop state of the motor vehicle, for example, marks indicative of functions of actuating a trunk opener, actuating a fuel lid opener, parking, etc. are displayed, as stop mode functions, by the LCD 26 so as to correspond to the push-button switches 25, respectively. Meanwhile, in the case where the mode changeover switch 27 has been set to the running mode, marks indicative of functions other than those of the stop mode functions, for example, marks indicative of functions of actuating an antenna, actuating a sun roof, actuating a rear heater, etc. performable in both the stop state and a running state of the motor vehicle are displayed, as running mode functions, by the LCD 26 so as to correspond to the push-button switches 25, respectively. Each of the push-button switches 25 is provided with a push-button LED 31 for displaying, through its energizing, actuation of each of the push-button switches 25.

The base 23 and the printed circuit board 22 have a shape of an identical rectangular plate. The base 23 having the printed circuit board 22 mounted on its front face is secured to the casing 24 by screwing four screws 33, through holes 32 formed at four corner portions of the base 23 and holes 32 formed at four corner portions of the printed circuit board 22, into the casing 24. The base 23 is formed with two threaded holes 34 such that the switch control device K1 is secured to the motor vehicle by screwing screws 35 into the threaded holes 34. The base 23 is formed with a rectangular opening 36 for inserting therethrough the cables 30. A pair of rectangular projections 37 engageable with the casing 24 are formed at opposite side portions of the front face of the base 23.

Meanwhile, the casing 24 has a rectangular display window 39 formed on a front face thereof. The display window 39 is provided with a transparent protective plate 38 confronting the LCD 26 of the printed circuit board 22. The casing 24 further has a rectangular display window 41 formed on the front face. The display window 41 is provided with a mode display film 40 confronting the LEDs 28. Furthermore, a rectangular opening 42 for exposing therethrough the push-button switches 25 on the front face of the casing 24 is provided adjacent to the display windows 39 and 41. Moreover, the casing 24 is formed with a rectangular opening 43 for exposing therethrough the mode changeover switch 27 on the front face of the casing 24.

Figure 3:
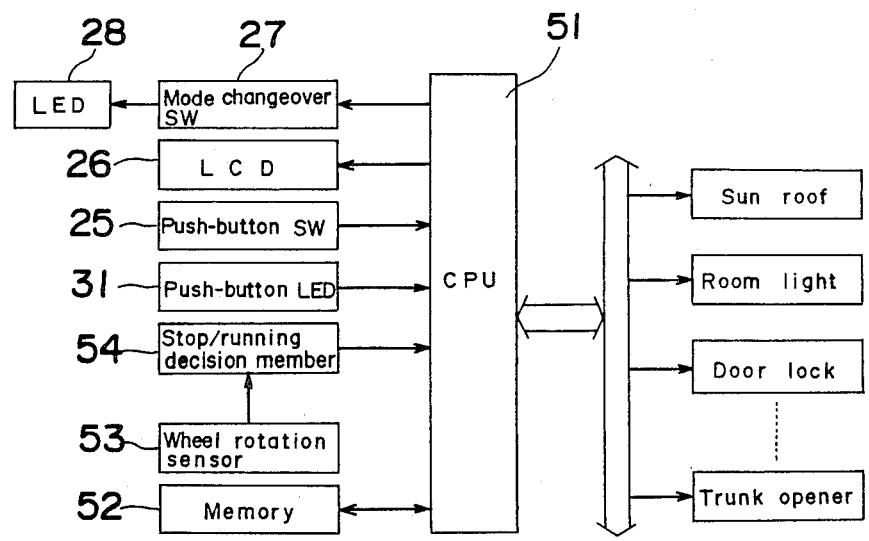
FIG. 3 is a block diagram of a control circuit employed in the switch control device of FIG. 1.

Referring to FIG. 3, there is shown a control circuit employed in the switch control device K1. The control circuit includes a central processing unit (CPU) 51 for controlling respective apparatuses of the motor vehicle in accordance with a program stored in a memory 52, a wheel rotation sensor 53 for detecting whether wheels of the motor vehicle are in a halt state or in a rotational state, and a stop/running decision member 54 for deciding whether the motor vehicle is in the stop state or in the running state on the basis of a detection signal from the wheel rotation sensor 53.

Figure 4A:
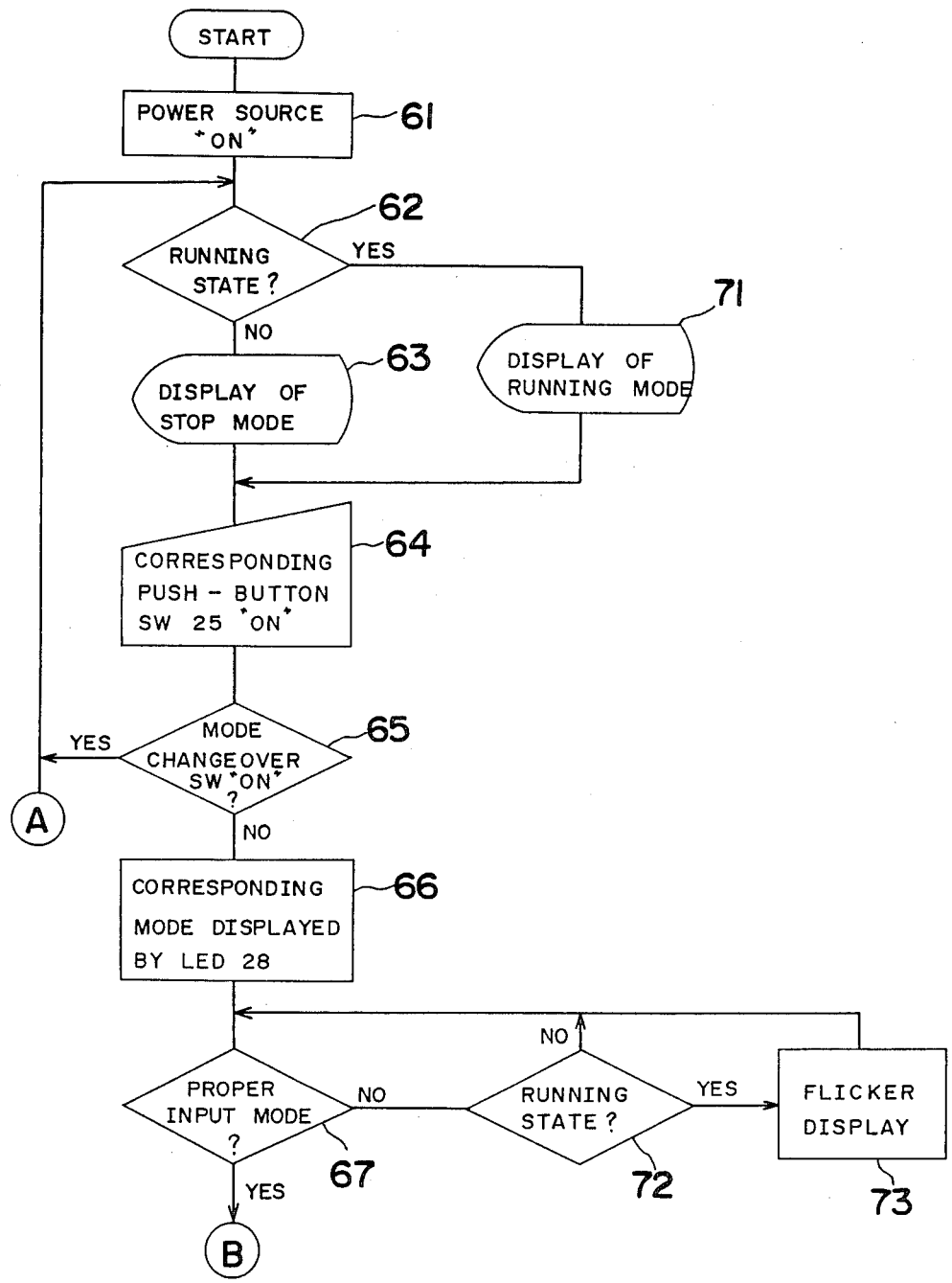
FIGS. 4a and 4b are flow charts showing a processing sequence of the switch control device of FIG. 1.
Figure 4B:
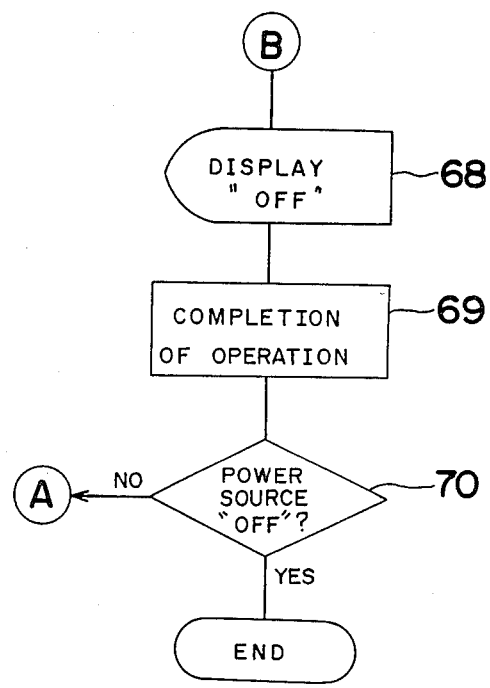

Hereinbelow, a processing sequence of the switch control device K1 of the above described arrangement will be described with reference to flow charts of FIGS. 4a and 4b. Initially, when a power source of the switch control device K1 has been turned on at step 61 in the case where the motor vehicle is in the stop state, a decision is made at step 62 as to whether the motor vehicle is in the stop state or in the running state. In the case where a decision has been made at step 62 that the motor vehicle is in the stop state, one of the LEDs 28 displays, through its energizing, a mark indicative of the stop mode and the marks indicative of the stop mode functions are displayed by the LCD 26 at step 63. Then, at step 64, a desired one of the push-button switches 25 corresponding to the stop mode functions, respectively is depressed. If a mark of a desired function is not displayed by the LCD 26 at step 63, the mode changeover switch 27 is depressed at step 65 so as to change over the motor vehicle to the running mode. If the desired push-button switch 25 corresponding to one stop mode function of, for example, actuating the trunk opener has been depressed at step 64, the trunk of the motor vehicle is opened automatically and a push-button LED 31 corresponding to the desired push-button switch 25 is turned on at step 66, so that it becomes possible to ensure that the desired push-button switch 25 is turned on. Subsequently, when the trunk has been closed at step 67, the push-button LED 31 is turned off at step 68. At step 69, an input operation for actuating the trunk opener is completed. If it is found at step 70 that the power source of the switch control device K1 is not turned off, the program flow proceeds to step 62 so as to repeat the same procedures as described above. If it is unnecessary to operate the push-button switches 25 any more, it is found at step 70 that the power source of the switch control device K1 is turned off, so that the program flow proceeds to "END" designation.

Then, in the case where the motor vehicle is in the running state, the other one of the LEDs 28 displays, through its energizing, a mark indicative of the running mode on the basis of a signal representing a decision that the motor vehicle is in the running state at step 71. At the same time, the marks indicative of the running mode functions of actuating the sun roof, actuating a room light, actuating a door lock, etc. are displayed by the LCD 26. Thereafter, when a desired one of the push-button switches 25 corresponding to the running mode functions, respectively has been depressed at step 64, the sun roof, for example, is automatically opened or closed and a push-button LED 31 corresponding to the desired push-button switch 25 is turned on, so that it becomes possible to ensure that the desired push-button switch 25 is turned on. Meanwhile, in the case where the motor vehicle is brought to a halt in the course of automatic operation of the apparatuses (e.g., the sun roof), for example, at an intersection due to a red traffic signal, the motor vehicle is changed over to the stop mode after completion of automatic operation of the apparatuses.

Meanwhile, in the case where the motor vehicle is undesirably caused to start running while the trunk is open, it is found at step 67 that the input mode is improper. Then, at step 72, the corresponding LED 28 displays, through its energizing, the mark of the stop mode. Subsequently, at step 73, the push-button LED 31 corresponding to the push-button switch 25 for actuating the trunk opener starts flickering so as to warn the driver of the motor vehicle that the trunk is not closed properly.

Furthermore, in the case where the running mode functions are performed during stop of the motor vehicle, the mode changeover switch 27 is depressed and thus, the motor vehicle is changed over to the running mode. On the other hand, even if the mode changeover switch 27 is depressed during running of the motor vehicle, the motor vehicle is not changed over to the stop mode.

Figure 5:
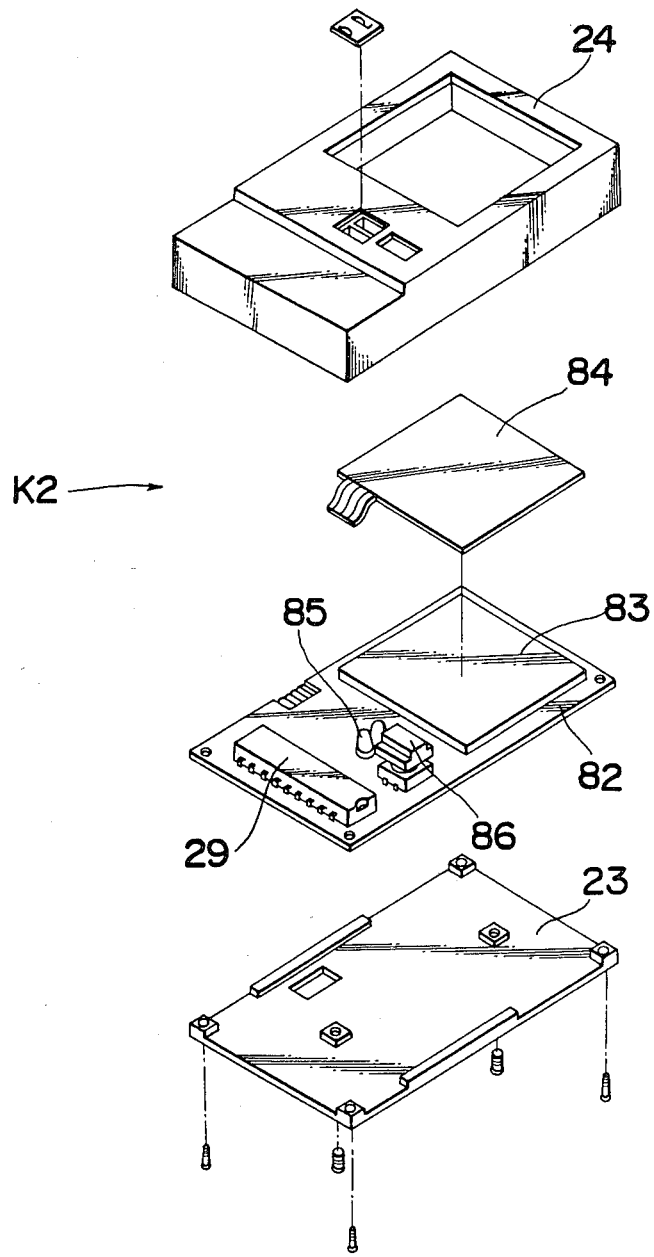
FIGS. 5 and 6 are views similar to FIGS. 1 and 2, respectively, particularly showing a second embodiment of the present invention.
Figure 6:
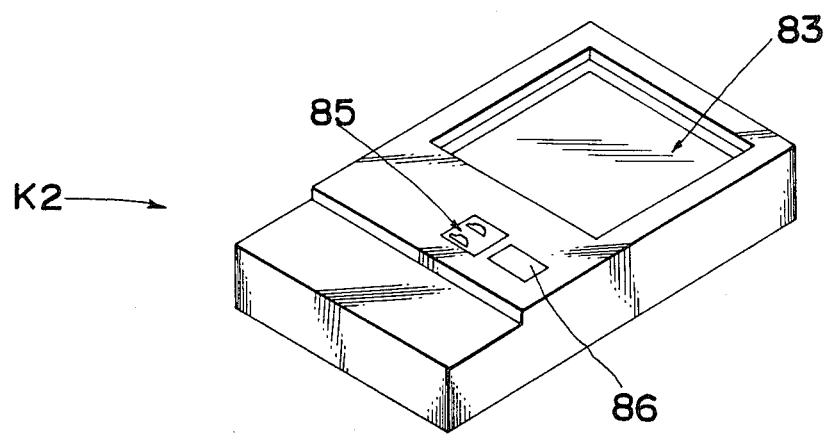

Referring to FIGS. 5 and 6, there is shown a touch panel type switch control device K2 according to a second embodiment of the present invention. The switch control device K2 includes a printed circuit board 82 having an LCD 83 mounted thereon such that a transparent touch panel switch 84 having a rectangular platelike shape is placed on the front face of the LCD 83. When an LED 85 for the stop mode is turned on, the marks indicative of the various stop mode functions are displayed by the LCD 83. Meanwhile, when another LED 85 for the running mode is turned on, the marks indicative of the various running mode functions are displayed by the LCD 83. A desired one of the stop mode functions or the running mode functions is inputted to the switch control device K2 by depressing a portion of the front face of the touch panel switch 84, which portion is disposed on the mark of the desired one of the stop mode functions or the running mode functions displayed by the LCD 83. By using a mode changeover switch 86, it becomes possible to effect changeover between the stop mode and the running mode such that the mark of one of the stop mode and the running mode is displayed by the corresponding LED 85.

Figure 7:
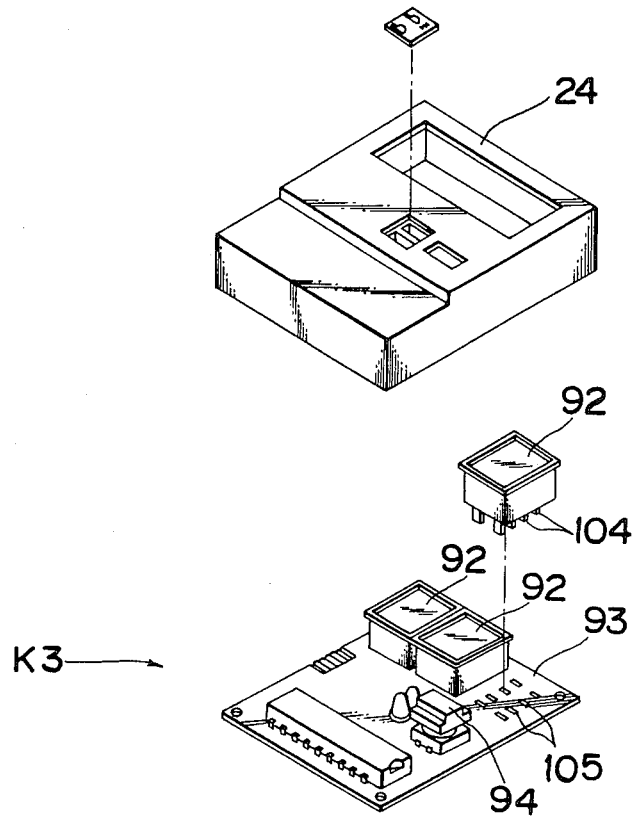
FIGS. 7 and 8 are views similar to FIGS. 1 and 2, respectively, particularly showing a third embodiment of the present invention.
Figure 8:
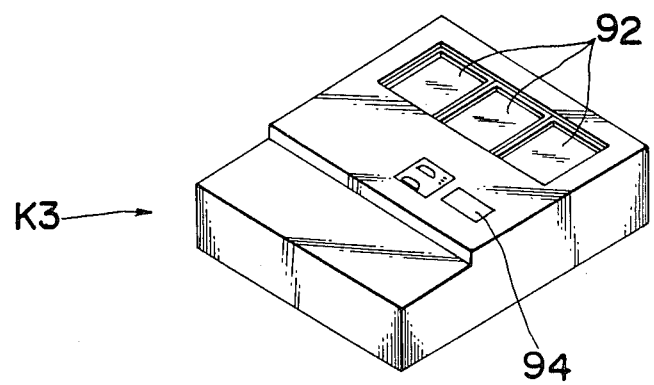
Figure 9:
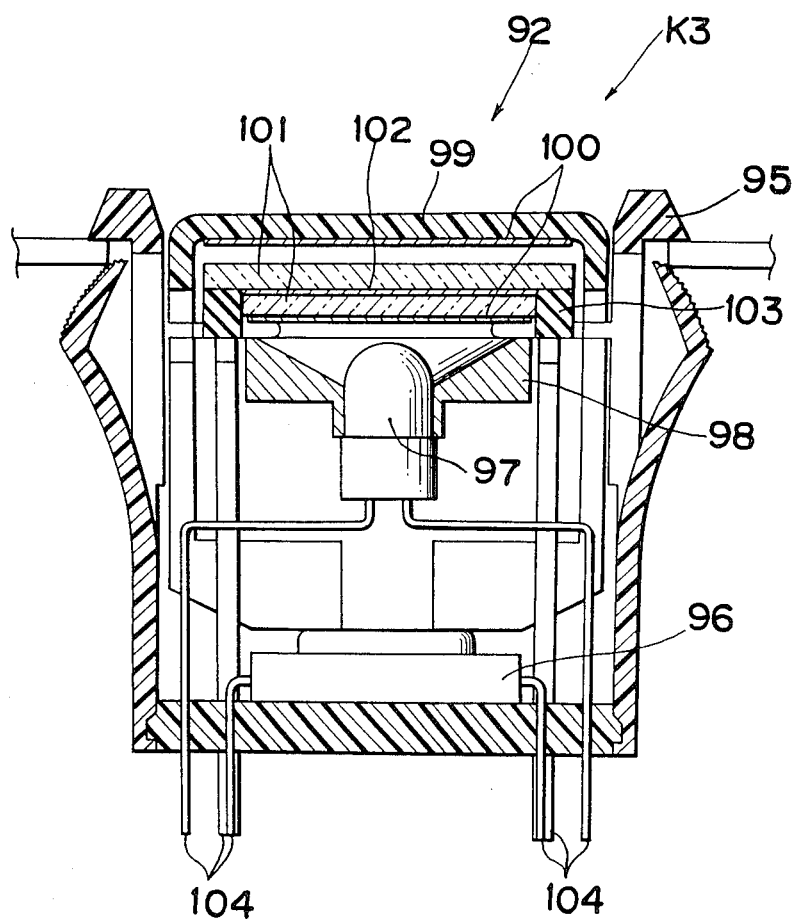
FIG. 9 is a vertical sectional view of a push-button switch employed in the switch control device of FIG. 7.

Referring to FIGS. 7 to 9, there is shown a switch control device K3 according to a third embodiment of the present invention. The switch control device K3 includes a plurality of push-button switches 92 placed independently of one another on the front face of a printed circuit board 93. Each of the push-button switches 92 has a built-in LCD for displaying one of the marks indicative of the stop mode functions or the running mode functions. Namely, one of the marks indicative of the stop mode functions or the running mode functions designated by a mode changeover switch 94 is displayed on the front face of each of the push-button switches 92. A desired one of the stop mode functions or the running mode functions is inputted to the switch control device K3 by depressing the front face of the push-button switch 92 corresponding to the desired one of the stop mode functions or the running mode functions such that the depressed push-button switch 92 is lit up with high brightness. More specifically, as shown in FIG. 9, each of the push-button switches 92 includes a casing 95 in which a switch 96, a light emitting lamp 97 and a reflecting plate 98 are incorporated. Polarizing plates 100, glass plates 101 and a liquid crystal plate 102 are mounted on the upper portion of the casing 95 so as to be enclosed by a push button 99. Reference numerals 103, 104 and 105 represent a connector made of electrically conductive rubber, terminals and terminal holes, respectively.

Figure 10:
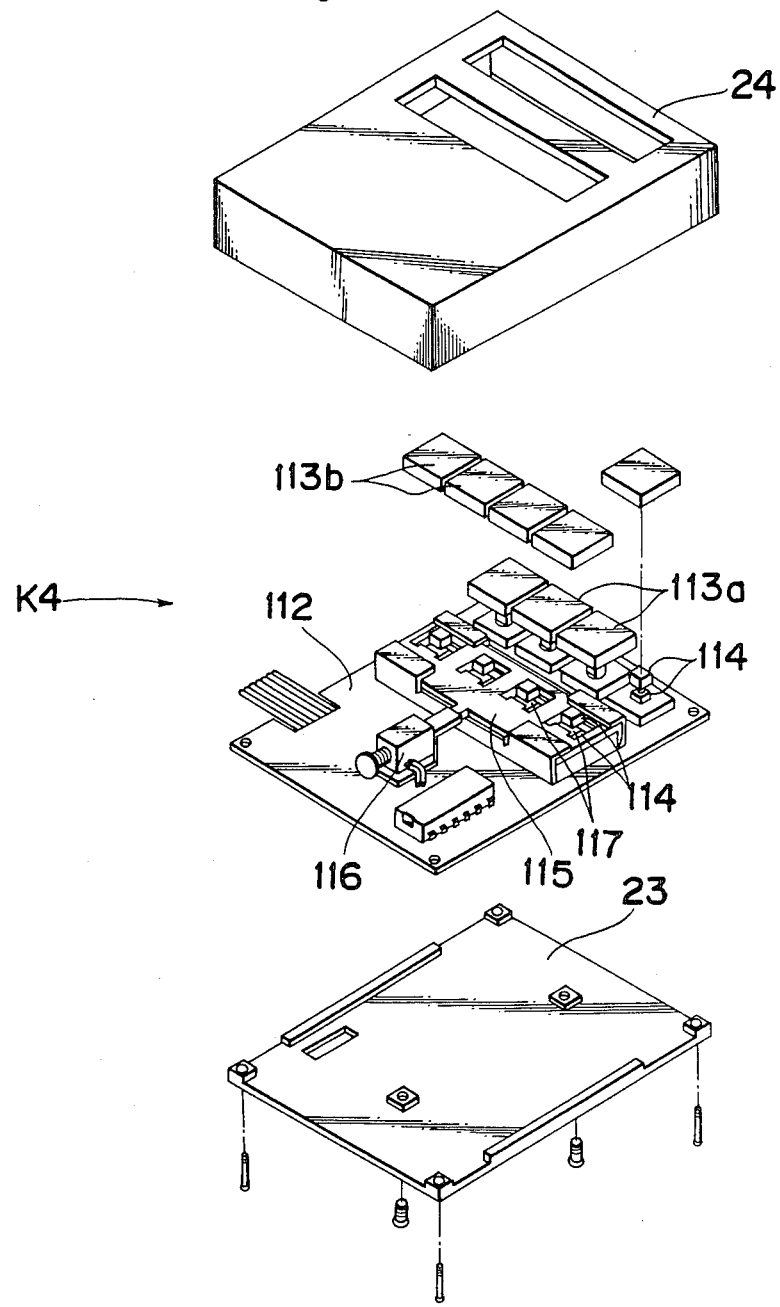
FIGS. 10 and 11 are views similar to FIGS. 1 and 2, respectively, particularly showing a fourth embodiment of the present invention.
Figure 11:
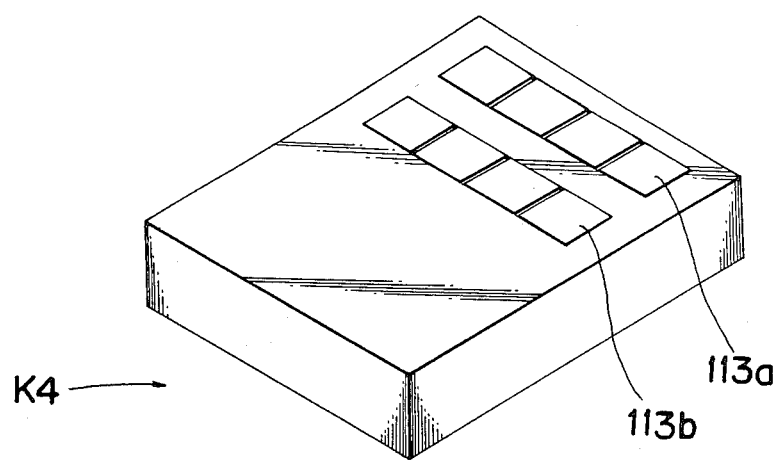

Referring further to FIGS. 10 and 11, there is shown a switch control device K4 according to a fourth embodiment of the present invention. The switch control device K4 includes a plurality of push-button switches 113a for the respective running mode functions and a plurality of push-button switches 113b for the respective stop mode functions. The push-button switches 113a are arranged in a row at an upper portion of the front face of a printed circuit board 112, while the push-button switches 113b are arranged, on the front face of the printed circuit board 112, in a row downwardly of the push-button switches 113a. Each of the push-button switches 113a and 113b includes switch contact portions 114 confronting each other. A shielding plate 115 is provided at the push-button switches 113b so as to be retractably inserted between the switch contact portions 114 of the push-button switches 113b by a solenoid 116 such that switching operation of the pushbutton switches 113b is regulated by the shielding plate 115. Namely, when the motor vehicle is in the stop state, the shielding plate 115 is disposed at its retracted position and thus, it is possible to depress all the push-button switches 113a and 113b. Meanwhile, when the motor vehicle is in the running state, the shielding plate 115 is advanced so as to prevent the stop mode functions from being inputted to the switch control device K4. Thus, each of the tongue pieces 117 formed in openings of the shielding plates 115, respectively is inserted between the switch contact portions 114 of each of the push-button switches 113b so as to prevent the push-button switches 113b for the stop mode functions from being depressed such that only the running mode functions are allowed to be inputted to the switch control device K4.

Figure 12:
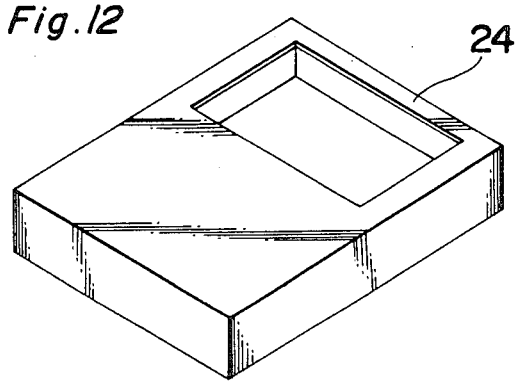
FIGS. 12 and 13 are views similar to FIGS. 1 and 2, respectively, particularly showing a fifth embodiment of the present invention.
Figure 12:
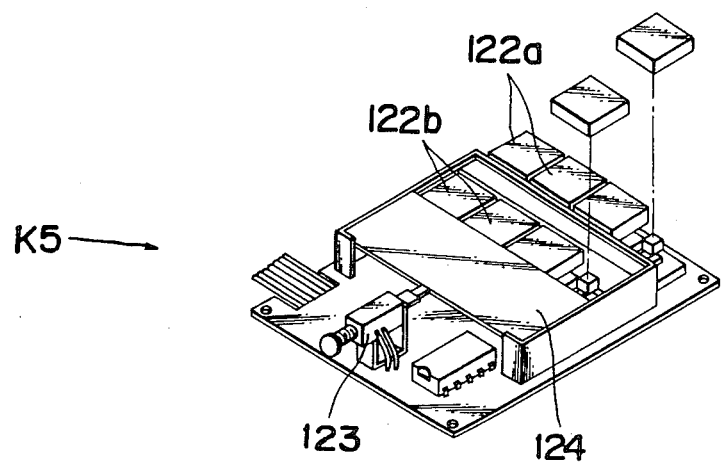
Figure 12:
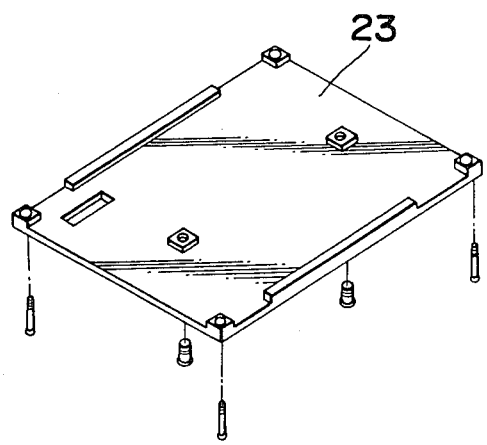
Figure 13:
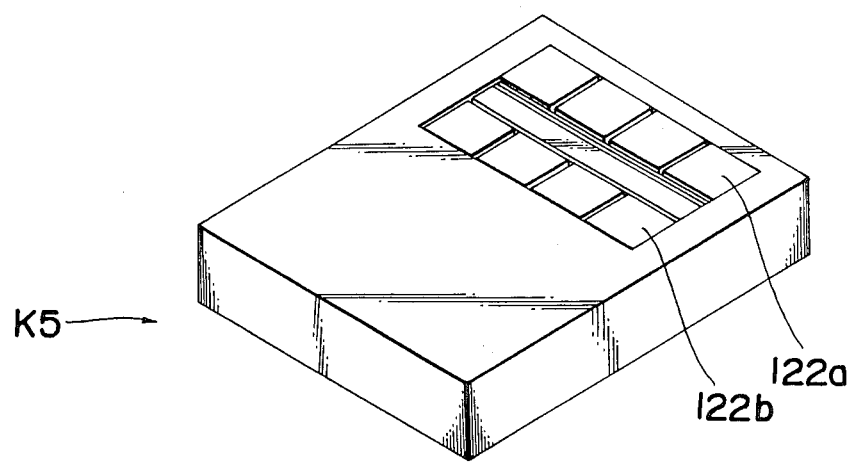

Referring finally to FIGS. 12 and 13, there is shown a switch control device K5 according to a fifth embodiment of the present invention. The switch control device K5 includes a plurality of push-button switches 122a for the respective running mode functions and a plurality of push-button switches 122b for the respective stop mode functions. In a manner similar to that of the switch control device K4, the push-button switches 122a are arranged in a row at an upper portion of the front face of a printed circuit board, while the push-button switches 122b are arranged, on the front face of the printed circuit board, in a row downwardly of the push-button switches 122a. A shielding plate 124 coupled with a solenoid 123 is provided so as to retractably cover wholly front faces of the push-button switches 122b such that switching operation of the push-button switches 122b is regulated by the shielding plate 124. Namely, when the motor vehicle is in the stop state, the shielding plate 124 is disposed at its retracted position and thus, it is possible to depress all the push-button switches 122a and 122b. Meanwhile, when the motor vehicle is in the running state, the shielding plate 124 is advanced so as to cover wholly the front faces of the push-button switches 122b such that the push-button switches 122b for the stop mode functions are prevented from being depressed, whereby only the push-button switches 122a for the running mode functions are allowed to be depressed.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:
1. A switch control device for a motor vehicle comprising a plurality of switches for actuating a plurality of apparatuses of said vehicle, at least one of said plurality of switches comprising a stop mode switch and a moving mode switch, said device further comprising a means for enabling the stop mode switch or the moving mode switch of said at least one of said plurality of switches, depending on whether or not the vehicle is in motion.

2. A switch control device as claimed in claim 1, wherein both the stop mode switch and the moving mode switch of said at least one of said plurality of switches are enabled when the vehicle is not in motion.

3. A switch control device as claimed in claim 1, wherein only the moving mode switch of said at least one of said plurality of switches in enabled when the vehicle is in motion.

4. A switch control device as claimed in claim 1, wherein only the stop mode switch of said at least one of said plurality of switches is enabled when the vehicle is not in motion.

5. A switch control device as claimed in claim 2, wherein only the moving mode switch of said at least one of said plurality of switches is enabled when the vehicle is in motion.

6. A switch control device as claimed in claim 1, further comprising a mode changeover switch which can alternately enable either the stop mode switch or the moving mode switch of said at least one of said plurality of switches only when the vehicle is not in motion.

7. A switch control device as claimed in claim 1, further comprising a display means for displaying whether the moving mode switch or the stop mode switch of said at least one of said plurality of switches is enabled.

8. A switch control device as claimed in claim 6, further comprising a display means for displaying whether the moving mode switch or the stop mode switch of said at least one of said plurality of switches is enabled.

9. A switch control method for controlling a plurality of switches for actuating a plurality of apparatuses of a motor vehicle, comprising the steps of:
   separating each of said plurality of switches into a stop mode switch and a moving mode switch; and
   enabling the stop mode switch or moving mode switch of each of said plurality of switches depending of whether or not the vehicle is in motion.

10. The method as claimed in claim 9, comprising enabling both the stop mode switch and the moving mode switch of each of said plurality of switches when the vehicle is not in motion.

11. The method as claimed in claim 9, comprising enabling only the stop mode switch of each of said plurality of switches when the vehicle is not in motion.

12. The method as claimed in claim 9, comprising enabling only the moving mode switch of each of said plurality of switches when the vehicle is in motion.

13. The method as claimed in claim 10, comprising enabling only the moving mode switch of each of said plurality of switches when the vehicle is in motion.

* * * * *